(12) United States Patent
Clow et al.

(10) Patent No.: US 8,854,997 B2
(45) Date of Patent: Oct. 7, 2014

(54) SHORTEST PATH ROUTING SYSTEMS AND METHODS FOR NETWORKS WITH NON-FULLY MESHED VERTICES

(75) Inventors: Leslie Clifton Clow, Stittsville (CA);
Tara Christine Graves, Ottawa (CA)

(73) Assignee: Ciena Corporation, Hanover, MD (US)

( * ) Notice: Subject to any disclaimer, the term of this patent is extended or adjusted under 35 U.S.C. 154(b) by 346 days.

(21) Appl. No.: 13/233,137

(22) Filed: Sep. 15, 2011

(65) Prior Publication Data
US 2013/0070617 A1    Mar. 21, 2013

(51) Int. Cl.
*H04L 12/28* (2006.01)
*H04L 12/16* (2006.01)
*H04L 12/721* (2013.01)

(52) U.S. Cl.
CPC .............. *H04L 45/124* (2013.01); *H04L 45/62* (2013.01); *H04L 45/12* (2013.01)
USPC .......................................... 370/252; 370/351

(58) Field of Classification Search
CPC ....... H04L 74/10; H04L 45/00; H04L 43/062; H04L 43/065
USPC ........................................................ 370/252
See application file for complete search history.

(56) References Cited

U.S. PATENT DOCUMENTS

| | | | |
|---|---|---|---|
| 5,781,537 A * | 7/1998 | Ramaswami et al. | 370/254 |
| 7,466,688 B2 | 12/2008 | Alicherry et al. | |
| 8,139,492 B1 * | 3/2012 | Peterson et al. | 370/238 |
| 2005/0169236 A1 * | 8/2005 | Chopping et al. | 370/351 |
| 2010/0158528 A1 | 6/2010 | Resende et al. | |
| 2011/0051624 A1 | 3/2011 | Gnanasekaran et al. | |
| 2011/0080846 A1 | 4/2011 | He et al. | |
| 2011/0164527 A1 * | 7/2011 | Mishra et al. | 370/252 |

OTHER PUBLICATIONS

Wim Pijls, Henk Post, A new bidirectional search algorithm with shortened postprocessing, European Journal of Operational Research, vol. 198, Issue 2, Oct. 16, 2009, pp. 363-369, ISSN 0377-2217.*

Khaled Maamoun and Hussein T. Mouftah; "A Simple Scheme for Routing and Wavelength Assignment in WDM Networks"; School of Information Technology and Engineering, University of Ottawa, Ontario, CA; In Proceedings: SpringSim'2008.

* cited by examiner

*Primary Examiner* — Michael Thier
*Assistant Examiner* — Brian Cox
(74) *Attorney, Agent, or Firm* — Clements Bernard PLLC; Christopher L. Bernard; Lawrence A. Baratta, Jr.

(57) ABSTRACT

Shortest path routing systems and methods are presented for networks with non-fully meshed vertices or nodes. The systems and methods may include a shortest path routing method in a network with non-fully meshed vertices, a network with non-fully meshed vertices, and a system for implementing the shortest path routing methods. The shortest path routing systems and methods include modifications to the Dijkstra algorithm to more accurately model a network, such as an optical or photonic network. In an exemplary embodiment, the Dijkstra algorithm is modified to represent degrees at a site with an ingress vertex (e.g., a demultiplexer) and an egress vertex (e.g., a multiplexer). In another exemplary embodiment, in addition to representing degrees as ingress and egress vertices, the Dijkstra algorithm is modified to maintain knowledge of previously visited degrees to prevent revisiting a same degree in determining a shortest path.

15 Claims, 7 Drawing Sheets

SHORTEST PATH ROUTING SYSTEMS AND METHODS FOR NETWORKS WITH NON-FULLY MESHED VERTICES

FIELD OF THE INVENTION

The present invention relates generally to networking systems and methods. More particularly, the present invention relates to shortest path routing systems and methods for networks with non-fully meshed vertices or nodes, vertices or nodes of a plurality of degrees where some of the degrees lack connectivity therebetween.

BACKGROUND OF THE INVENTION

In networks, the shortest path problem is the problem of finding a path between two vertices (or nodes) in a graph such that the sum of the weights of its constituent edges is minimized. The shortest path is utilized, for example, in provisioning a new demand on the network. Various techniques exist in the art for determining the shortest path in a network. Recent techniques have focused on a Constrained Shortest Path First (CSPF) and related work for Internet Protocol (IP), Layer Two networks such as Ethernet, and Layer One networks (e.g., Synchronous Optical Network (SONET), Synchronous Digital Hierarchy (SDH), Optical Transport Network (OTN), etc.) in which forbidden sub-paths generally do not occur or can be engineered out. For example, one technique is Dijkstra's Algorithm which is a graph search algorithm that solves the single-source shortest path problem for a graph with nonnegative edge path costs, producing a shortest path tree.

Routing in a wavelength division multiplexing (WDM) agile network requires an algorithm that can find the shortest path while avoiding forbidden sub-paths as some reconfigurable optical add/drop multiplexer (ROADM) sites are non-fully meshed. A non-fully meshed node is a node of a plurality of degrees where some of the degrees lack connectivity therebetween. Furthermore, typically routing requests are for bi-directional paths across an optical network which is inherently unidirectional technology. Lastly, due to the physical construction of a wavelength selective switch (WSS) or other type of photonic cross-connect and how it must be interconnected to create a ROADM, entering in one photonic direction does not result in the same set of paths as entering the same node from a different photonic direction. Conventional solutions to finding a bi-directional path across non-fully meshed networks appear to assume no a priori knowledge of the routing area, and furthermore do not leverage domain specific information (i.e., ROADM behavior) to achieve a fast routing solution. In short, the Dijkstra's Algorithm works for unidirectional connections in a unidirectional photonic network but not for bidirectional connections in a unidirectional photonic network.

BRIEF SUMMARY OF THE INVENTION

In an exemplary embodiment, a shortest path routing method in a network with non-fully meshed vertices includes defining vertices for each degree in the network, the vertices at each degree including an ingress vertex and an egress vertex, wherein at least one site in the network including degrees which are not fully-meshed therebetween; and implementing a Dijkstra algorithm in a constrained manner to determine a shortest, bidirectional path through the network between two degrees in the network. The constrained manner may include maintaining each visited degree such that a same degree is not revisited in the Dijkstra algorithm. The shortest path routing method may include defining a transmit port to a receive port and a receive port to a transmit port as edges for each link in the network; wherein the constrained manner may include maintaining a set of each visited degree based on the edges and implementing the Dijkstra algorithm to exclude each edge and associated vertices based on the set such that a same degree is not revisited in the Dijkstra algorithm. Each degree in the network, except for the degrees which are not fully-meshed therebetween, may be configured to receive an ingress signal from an edge and transmit an egress signal to another degree at a same site for transmission to another edge. The each degree in the network may be configured to receive an input signal from the edge and transmit an output signal to the edge, the edge including a bidirectional link. The ingress vertex may include a demultiplexer and the egress vertex may include a multiplexer. The network may include an optical network, and the method may include implementing the Dijkstra algorithm in the constrained manner to find a first path through the network between two degrees in the network; and utilizing opposite vertices at each degree in the first path to define a second path through the network between two vertices in the network, the first path may include a path from a demultiplexer at a first degree of the two degrees to a multiplexer at a second degree of the two degrees, and the second path may include a path from a multiplexer at the first degree to a demultiplexer at the second degree.

In another exemplary embodiment, a network includes a plurality of network elements interconnected therebetween, each of the plurality of network elements including one or more degrees, wherein at least one network element including degrees which are not fully-meshed therebetween; and a controller configured to determine a shortest path between any of the plurality of network elements, the controller configured to: define an ingress vertex and an egress vertex for each degree of the one or more degrees; and implement a Dijkstra algorithm in a constrained manner to determine a shortest path through the network between two degrees in the network The constrained manner may include the controller maintaining each visited degree such that a same degree is not revisited in the Dijkstra algorithm. The controller may be further configured to define a transmit port to a receive port and a receive port to a transmit port as edges for each link in the network; wherein the constrained manner may include the controller maintaining a set of each visited degree based on the edges and implementing the Dijkstra algorithm to exclude each edge and associated vertices based on the set such that a same degree is not revisited in the Dijkstra algorithm. Each degree in the network, except for the degrees which are not fully-meshed therebetween, is configured to receive an ingress signal from an edge and transmit an egress signal to another degree at a same site for transmission to another edge. The each degree in the network is configured to receive an input signal from the edge and transmit an output signal to the edge, the edge including a bidirectional link. The ingress vertex may include a demultiplexer and the egress vertex may include a multiplexer. The network may include an optical network, and the controller may be further configured to: implement the Dijkstra algorithm in the constrained manner to find a first path through the network between two degrees in the network; and utilize opposite vertices at each degree in the first path to define a second path through the network between two vertices in the network, the first path may include a path from a demultiplexer at a first degree of the two degrees to a multiplexer at a second degree of the two degrees, and the second path may include a path from a multiplexer at the first degree to a demultiplexer at the second degree.

In yet another exemplary embodiment, a system includes a data store; a network interface; and a processor, wherein the data store, the network interface, and the processor are communicatively coupled therebetween; and wherein the processor is configured to: maintain a network topology of a network, the network topology including vertices and edges; define an ingress vertex and an egress vertex for each degree in the network; implement a Dijkstra algorithm in a constrained manner to determine a shortest path through the network between an ingress vertex at a first degree in the network and an egress vertex at a second degree in the network. The network topology may include a non-fully meshed topology in at least one site of the network. The system may include a controller module in a network element. The system may include a network planning system or a network management system. The constrained manner may include maintaining each visited degree such that a same degree is not revisited in the Dijkstra algorithm.

BRIEF DESCRIPTION OF THE DRAWINGS

The present invention is illustrated and described herein with reference to the various drawings of exemplary embodiments, in which like reference numbers denote like method steps and/or system components, respectively, and in which.

DETAILED DESCRIPTION OF THE INVENTION

In various exemplary embodiments, the present disclosure relates to shortest path routing systems and methods for networks with non-fully meshed vertices or nodes. The systems and methods may include a shortest path routing method in a network with non-fully meshed vertices, a network with non-fully meshed vertices, and a system for implementing the shortest path routing methods. The shortest path routing systems and methods include modifications to the Dijkstra algorithm to more accurately model a network, such as an optical or photonic network. In an exemplary embodiment, the Dijkstra algorithm is modified to represent degrees at a site with an ingress vertex (e.g., a demultiplexer) and an egress vertex (e.g., a multiplexer). In another exemplary embodiment, in addition to representing degrees as ingress and egress vertices, the Dijkstra algorithm is modified to maintain knowledge of previously visited degrees to prevent revisiting a same degree in determining a shortest path. As such, the shortest path routing systems and methods for networks provide a shortest, bidirectional path in a graph or network with non-fully meshed vertices or nodes.

Figure 1:
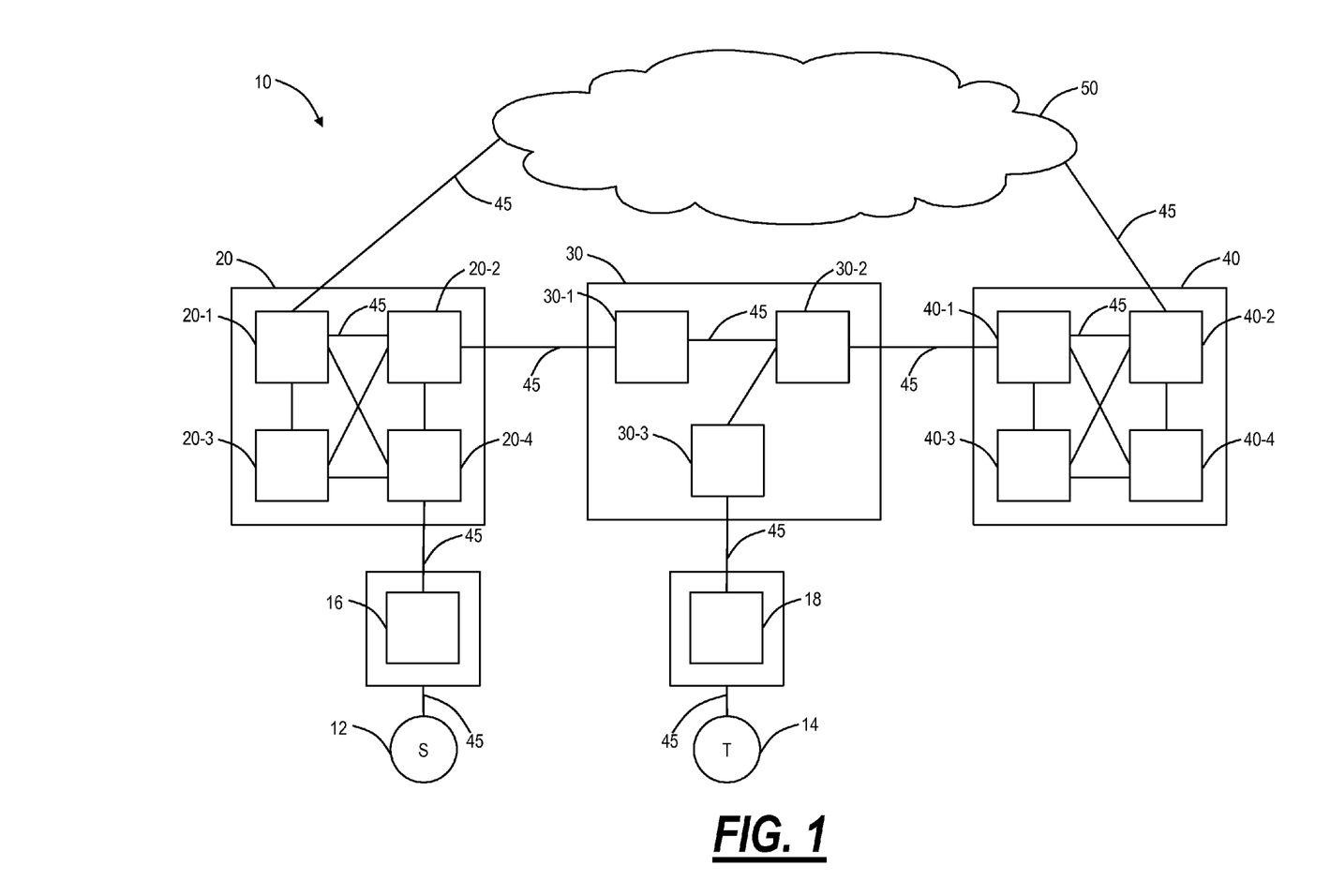
FIG. 1 is a network diagram of a network with a non-fully meshed vertex or node interconnecting two nodes.

Referring to FIG. 1, in an exemplary embodiment, a network 10 is illustrated interconnecting two nodes 12, 14. In this exemplary network 10, there are five sites 16, 18, 20, 30, 40 which may be interconnected by links 45 which may include any type of physical medium such as, but not limited to, optical fiber, coaxial cable, wireless links, and the like. Further, each of the links 45 while shown as a single connection may be bidirectional enabling communication to/from interconnected nodes. In this exemplary embodiment, the site 20 is connected to the site 30 which is connected to the site 40. Further, the node 12 is connected to the site 16 which is connected to the site 20, and the node 14 is connected to the site 18 which is connected to the site 30. Further, the sites 20, 40 are also interconnected via a really long path 50 illustrated as a cloud in FIG. 1. The really long path 50 is an undesirable path between the site 20, 40 based on a plurality of factors, such as, for example, distance, cost, etc. The network 10 may include any type of communication network where the two nodes 12, 14 communicate data in any format therein. In an exemplary embodiment, the network 10 may include an optical network such as a wavelength division multiplexed (WDM) or dense WDM (DWDM) network. In another exemplary embodiment, the network 10 may include a network utilizing protocol and formats such as Synchronous Optical Network (SONET), Synchronous Digital Hierarchy (SDH), Optical Transport Network (OTN), Ethernet, Internet Protocol (IP), Multi-Protocol Label Switching (MPLS), Generalized MPLS (GMPLS), Automatic Switched Optical Network (ASON), wireless protocols (IEEE 802.11, 802.16, LTE, etc.), and the like.

In this exemplary embodiment, the site 20, 40 are four degree network elements with degrees 20-1, 20-2, 20-3, 20-4, 40-1, 40-2, 40-3, 40-3. The site 30 is a three degree network elements with degrees 30-1, 30-2, 30-3. The degree of a network element in a network such as the network 10 is the number of connections or edges the network element has to other network elements. Importantly, the site 30 is a non-fully meshed vertex or node, i.e. the degrees 30-1, 30-3 have no interconnectivity therebetween. As described herein, vertices may be network elements (e.g., network elements at the sites 16, 18, 20, 30, 40), degrees (e.g., the degrees 20-1, 20-2, 20-3, 20-4, 40-1, 40-2, 40-3, 40-3 which may be ROADM network elements), multiplexers/demultiplexers at the degrees 20-1, 20-2, 20-3, 20-4, 40-1, 40-2, 40-3, 40-3, and the like. The term node may be used interchangeably with vertex. Conceptually, the various physical elements in the network 10 may be defined in a plurality of manners as a graph of vertices/nodes interconnected via edges/links 45 upon which various shortest path algorithms may be implemented. With respect to determining shortest paths between the nodes 12, 14, one exemplary technique is the Dijkstra algorithm. The Dijkstra algorithm is a known routing algorithm for determining the best path between a source node and a destination node. The Dijkstra algorithm generally includes a series of "expanding" steps in which a node is placed in the path and its neighbor nodes are examined to determine which node should next be placed in the path. The Dijkstra algorithm terminates when all destination nodes have been placed in the path.

Figure 2:
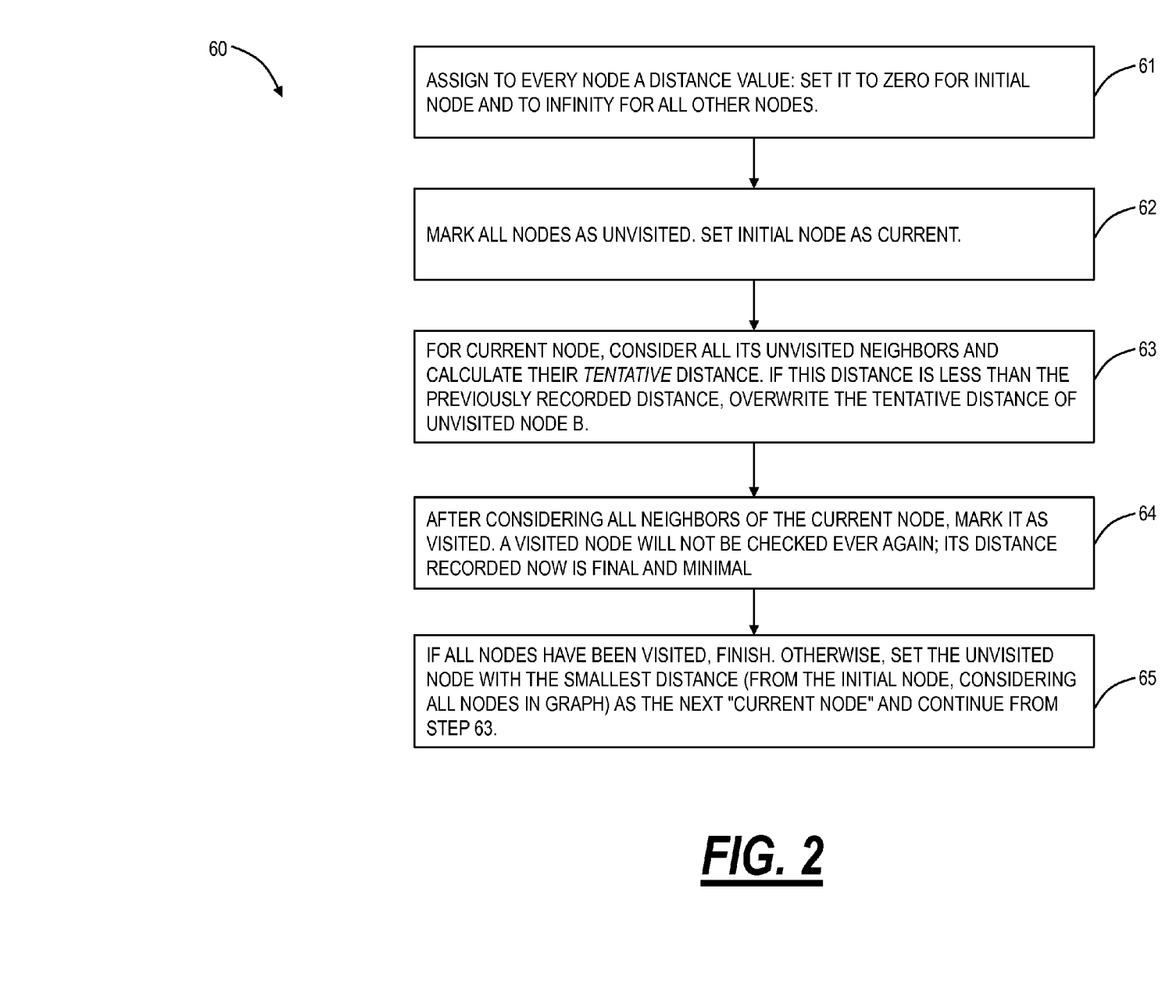
FIG. 2 is a flowchart of a method using the Dijkstra algorithm to determine a shortest path in a network such as the network of FIG. 1.

Referring to FIG. 2, in an exemplary embodiment, a flowchart illustrates a method 60 using the Dijkstra algorithm to determine a shortest path in a network such as the network 10. To start, a starting node, such as the node 16, is the initial node. Let a distance of node Y be the distance from the initial node to node Y. Dijkstra's algorithm will assign some initial distance values and will try to improve them step by step.

First, every node is assigned a distance value, e.g. it is set to zero for the initial node and to infinity for all other nodes (step 61). All nodes are marked as unvisited and the initial node is set as current (step 62). For the current node, the method 60 considers all of its unvisited neighbors and calculates the tentative distance to each (step 63). For example, if a current node (A) has distance of 6, and an edge connecting it with another node (B) is 2, the distance to B through A will be 6+2=8. If this distance is less than the previously recorded distance, overwrite the tentative distance of unvisited node B. When done considering all neighbors of the current node, it is marked as visited (step 64). A visited node will not be checked ever again; its distance recorded now is final and minimal. If all nodes have been visited, finish. Otherwise, set the unvisited node with the smallest distance (from the initial node, considering all nodes in graph) as the next "current node" and continue from step 63 (step 65).

Referring back to FIG. 1, assume using the method 60, one wants to find a path between the site 16, 18. As described herein, the Dijkstra algorithm may fail to find a path when non-fully meshed nodes such as the site 30 are present in the network 10. In an exemplary embodiment, the method 60 may represent each site 16, 18 and degree 20-1, 20-2, 20-3, 20-4, 30-1, 30-2, 30-4, 40-1, 40-2, 40-3, 40-4 as a vertex in a graph for computation using the Dijkstra algorithm and the edges are the links 45. Further, to prevent invalid paths in the network 10, a modification may be applied to the Dijkstra algorithm to exclude intra-node edges when finding a path. In other words, one is not permitted to take multiple hops within a node such as the sites 20, 30, 40. Put differently, this modification only allows for one hop within any of the sites 20, 30, 40. For example, it is not possible to go from the degree 30-1 to the degree 30-2 and back to degree node 30-3. Assume the degrees 30-1, 30-2, 30-3 are ROADM degrees, a path from the degree 30-1 to the degree 30-2 would the proceed to the degree 40-1.

While this modification prevents invalid paths, it also inadvertently breaks the Dijkstra algorithm in some cases. For example, using the Dijkstra algorithm to find a path from the site 16 to the site 18, one will reach the degree 30-2 rather quickly, e.g. site 16→degree 20-4→degree 20-2→degree 30-1→degree 30-2. However, based on the modification to the Dijkstra algorithm, one will correctly avoid proceeding from the degree 30-2 to the degree 30-3 (i.e., note 16→degree 20-4→degree 20-2→degree 30-1→degree 30-2→degree 30-3, is invalid based on the modification). The degree 30-2 will also quickly become the "current" vertex in the Dijkstra algorithm and subsequently be marked as "visited"—never to be re-visited because of the Dijkstra algorithm's greedy approach. There is a legitimate shortest path from the site 16 to the site 18 (i.e., site 16→site 20-4→degree 20-1→really long path 50→degree 40-2→degree 40-1→degree 30-2→degree 30-3→site 18) however the Dijkstra algorithm will never find it because the degree 30-2 was already visited—never to be visited again.

Figure 3:
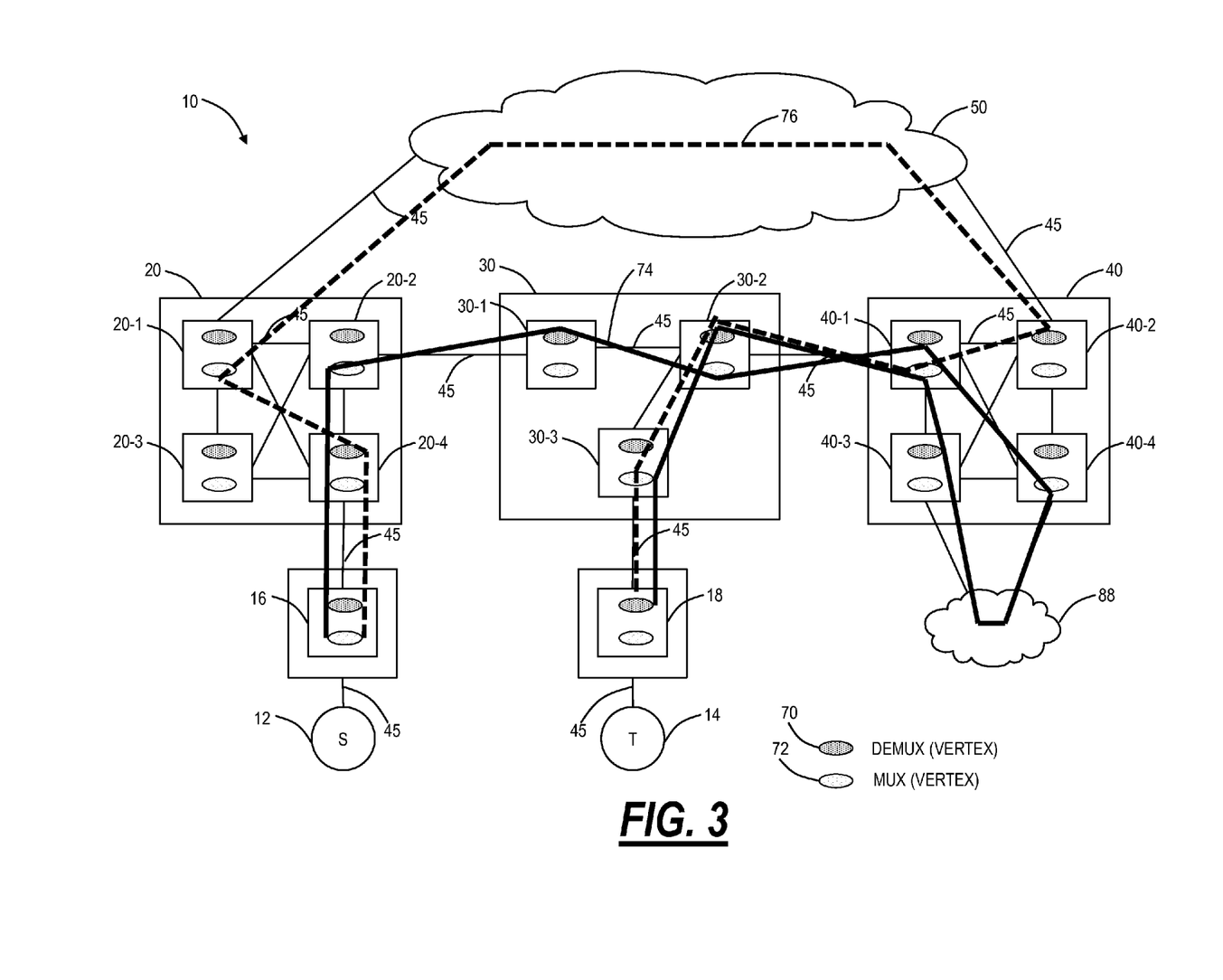
FIG. 3 is a network diagram of the network of FIG. 1 with vertices at each of the nodes and with an exemplary implementation of the Dijkstra algorithm to find paths between the nodes.

Referring to FIG. 3, in an exemplary embodiment, the network 10 is illustrated with vertices 70, 72 at each of the sites 16, 18, 20, 30, 40 and with an exemplary implementation of the Dijkstra algorithm to find paths 74, 76 between the nodes 16, 18. As described herein, the Dijkstra algorithm is implemented via nodes which are vertices and edges which are the links 45. There is a distance value associated with each node/vertex and edge/link which may be based on a plurality of factors such as distance, bandwidth, available bandwidth, optical fiber characteristics (e.g., chromatic and polarization mode dispersion, non-linear effects, etc.), and the like. In this exemplary embodiment, the method 60 may represent vertices 70, 72 at each site 16, 18 and each degree 20-1, 20-2, 20-3, 20-4, 30-1, 30-2, 30-4, 40-1, 40-2, 40-3, 40-4 as vertices in a graph for computation using the Dijkstra algorithm and the edges are the links 45. Differently from FIG. 1, the vertices model each of the nodes as with an ingress vertex, i.e. the vertex 70, and an egress vertex, i.e. the vertex 72. In an exemplary embodiment, the shortest path routing systems and methods provide a specific mapping of vertices/nodes to the physical network elements in the network 10 that conceptualizes the sites 16, 18 and the degrees 20-1, 20-2, 20-3, 20-4, 30-1, 30-2, 30-4, 40-1, 40-2, 40-3, 40-4 each as two separate nodes or vertices 70, 72.

In an optical network scenario, the vertex 70 may be conceptualized as a demultiplexer and the vertex 72 may be conceptualized as a multiplexer for WDM configurations. By splitting the nodes into vertices 70, 72, a graph is created with twice as many vertices, but the same number of edges. Advantageously, this represents the physical network better because ingress vertex 70 has one ingress edge and multiple egress edges whereas the egress vertex 72 has multiple ingress edges, but a single egress edge. For example, a demultiplexer such as the ingress vertex 70 has one ingress from the link 45, i.e. an incoming WDM signal, and multiple egress edges, i.e. individual optical signals sent to any number of degrees at a particular node. The multiplexer such as the egress vertex 72 ha multiple ingress edges, i.e. individual optical signals received from any number of degrees at a particular node, and one egress edge, i.e. an outgoing WDM signal.

Figure 4:
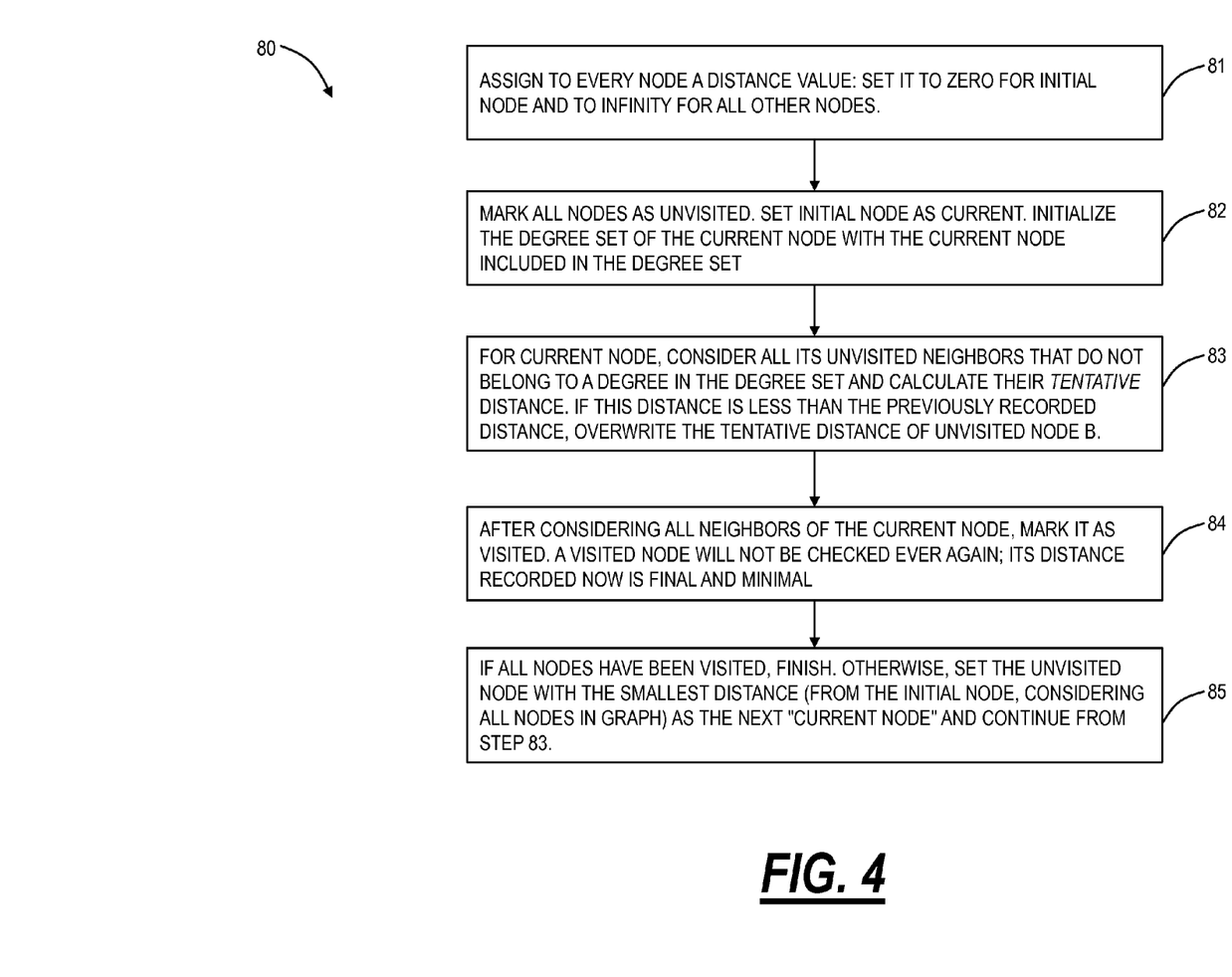
FIG. 4 is a flowchart of a method using the Dijkstra algorithm with modifications to determine a shortest, bi-directional path in a network such as the network of FIG. 3.

Referring to FIG. 4, in an exemplary embodiment, a flowchart illustrates a method 80 using the Dijkstra algorithm with modifications to determine a shortest, bi-directional path in a network such as the network 10. The method 80 may be utilized with the vertices 70, 72 and an additional set of data (hereinafter referred to as a degree set) to enable potential revisiting of particular nodes during the modified Dijkstra algorithm to provide a bidirectional path. Similar to the method 60, to start, a starting node, such as the node 16, is the initial node. Let a distance of node Y be the distance from the initial node to node Y. The Dijkstra algorithm will assign some initial distance values and will try to improve them step by step. Additionally, the method 80 maintains a degree set (initialized to empty) per "unvisited" node representing the set of sites 16, 18 or degrees 20-1, 20-2, 20-3, 20-4, 30-1, 30-2, 30-4, 40-1, 40-2, 40-3, 40-4 in the tentative shortest path to this unvisited node (note that visiting either the vertices 70, 72 of a degree would mean that the corresponding degree is added to this node's degree set). Every node is assigned a distance value with the initial node set to zero and all other nodes set to infinity (step 81).

All nodes are marked as unvisited, the initial node is set as current, and the degree set of the current node is initialized with the current node included in the degree set (step 82). For the current node, all its unvisited neighbors that do not belong to a degree in its degree are considered and their tentative distance is calculated (step 83). For example, if current node (A) has distance of 6, and an edge connecting it with another node (B) is 2, the distance to B through A will be 6+2=8. If this distance is less than the previously recorded distance, the tentative distance of unvisited node B is overwritten and node B's degree set is replaced with: {node A's degree set+B's degree}. When done considering all neighbors of the current node, the current node is marked as visited (step 84). A visited node will not be checked ever again; its distance recorded now is final and minimal. If all nodes have been visited, the method 80 is finished. Otherwise, set the unvisited node with the smallest distance (from the initial node, considering all nodes in graph) as the next "current node" and continue from step 83 (step 85).

Referring back to FIG. 3, consider a shortest path request from the node 16 to the node 18 using the vertices 70, 72 in FIG. 3. First, the path 74 represents a solution using the method 60 with the Dijkstra algorithm. Specifically, the path 74 includes a path from site 16→degree 20-4 vertex 70→node 20-2 vertex 72→node 30-1 vertex 70→node 30-2 vertex 72→node 40-1 vertex 70→node 40-4 vertex 72→a really short path 88→node 40-3 vertex 70→node 40-1 vertex 72→node 30-2 vertex 70→node 30-3 vertex 72→site 18. Thus, the modification using the vertices 70, 72 enable the method 60 to find a shortest path in the network 10 allowing revisiting of degrees by splitting the degrees into the vertices 70, 72. However, this modification and the method 60 may have difficulty in finding bidirectional paths because it permits revisiting a given degree. Specifically with respect to the path 74, the degree 30-2 uses both the vertices 70, 72 contained therein for a single path thereby preventing a bidirectional path, such as in the case of optical wavelengths. For example, the method 60 determines a unidirectional path, i.e. the path 74 provides connectivity starting at the site 16 and ending at the site 18. A corresponding path from the site 18 to the site 16 requires the opposite vertices 70, 72 of the path 74 at each site, and since the degree 30-2 uses both the vertices 70, 72 contained therein, there is no possible corresponding path from the site 18 to the site 16 on the same links as the path 74. In an exemplary embodiment, the method 80 provides a modification to the Dijkstra algorithm to ensure that one never revisits a given degree on a given path. This may be utilized with the vertices 70, 72 to ensure a bidirectional path is provided. Note, the method 60 with the vertices 70, 72 still may be utilized to provide a unidirectional path, i.e. the path 74 is a shortest, unidirectional path in the network 10 between the sites 16, 18.

Figure 5:
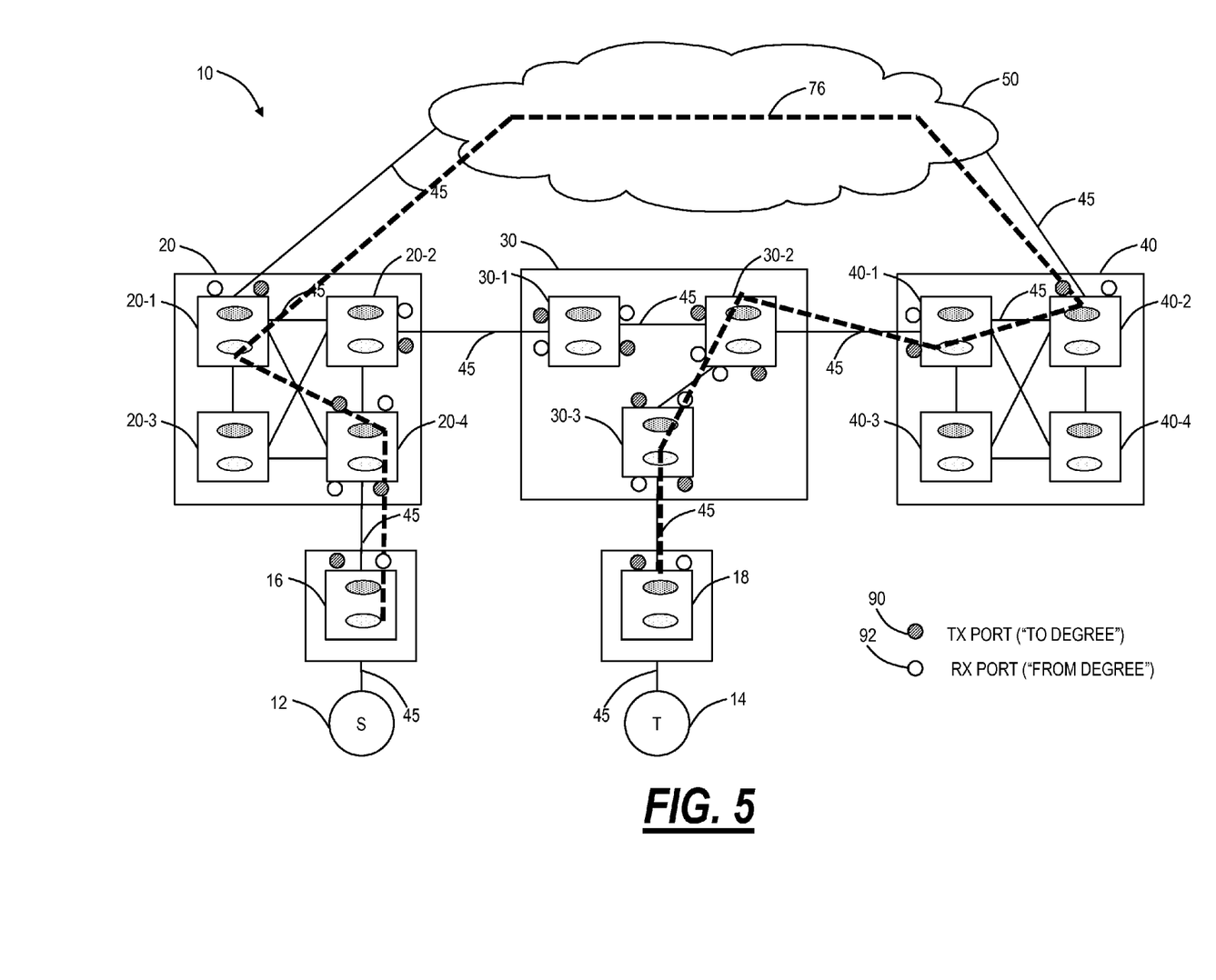
FIG. 5 is a network diagram of the network of FIGS. 1 and 3 with vertices and degree set ports at each of the sites and with an exemplary implementation of the Dijkstra algorithm to find the path between the nodes.

Referring to FIG. 5, in an exemplary embodiment, the network 10 is illustrated with vertices 70, 72 and degree set ports 90, 92 at each of the sites 16, 18, 20, 30, 40 and with an exemplary implementation of the Dijkstra algorithm to find the path 76 between the nodes 16, 18. In particular, the network 10 of FIG. 5 includes both the vertices 70, 72 and the degree set ports 90, 92 for implementation of the method 80. The port 90 is a transmit (TX) port to a particular degree and the port 92 is a receive (RX) port from a particular degree. The degree set ports 90, 92 are utilized to ensure the method 80 does not revisit a same degree in determining a shortest path such that a bidirectional path may be configured on the shortest path. In effect, the ports 90, 92 define plural edges on each of the links 45, e.g. an edge between the port 90 and the port 92 and another edge between the port 92 and the port 90. The path 76 is the shortest, bidirectional path in the network 10 and may be determined via the method 80 as the path site 16 vertex 70→degree 20-4 vertex 70→degree 20-1 vertex 72→really long path 50→degree 40-2 vertex 70→degree 40-1 vertex 72→degree 30-2 vertex 70→degree 30-3 vertex 72→site 18 vertex 72. In implementing the method 80, the degree set ports 90, 92 ensure the degree 30-2 is visited only once such that a bidirectional path is available. Specifically, the path 76 provides connectivity from the vertex 70 at the site 16 to the vertex 72 at the site 18. Another path using the same vertices and edges as the path 76 may provide connectivity from the vertex 72 at the site 16 to the vertex 70 at the site 18.

Figure 6:
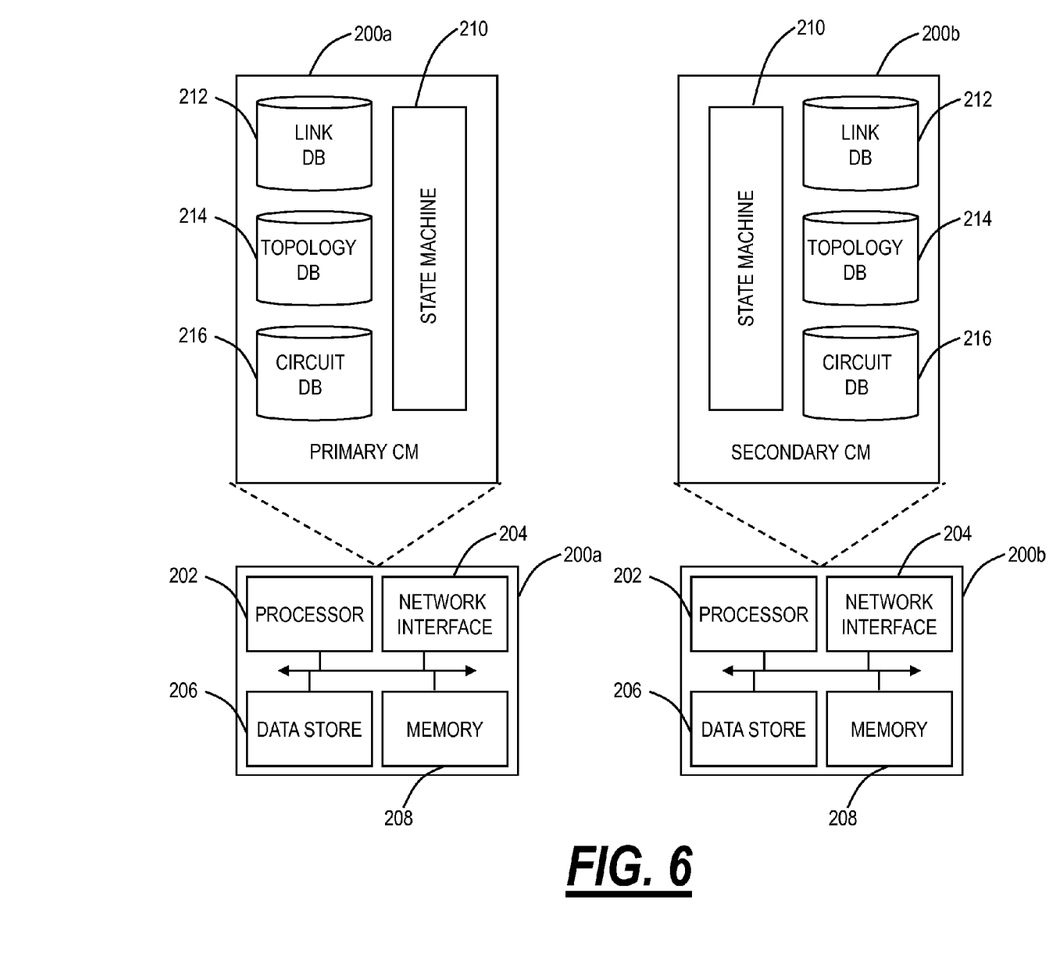
FIG. 6 is a block diagram of redundant control modules for a network element to provide shortest path routing systems and methods.

Referring to FIG. 6, in an exemplary embodiment, redundant control modules 200a, 200b for a network element are illustrated to provide shortest path routing systems and methods, control plane processing, network element control for operations, administration, maintenance, and provisioning, and the like. In an exemplary embodiment, the sites 16, 18, 20, 30, 40 may each include one or more network elements with the control modules 200a, 200b. For example, the control modules 200a, 200b may be part of common equipment of the network elements. The control modules 200a, 200b may include a processor 202 which is hardware device for executing software instructions such as operating the control plane. The processor 202 may be any custom made or commercially available processor, a central processing unit (CPU), an auxiliary processor among several processors associated with the control modules 200a, 200b, a semiconductor-based microprocessor (in the form of a microchip or chip set), or generally any device for executing software instructions. When the control modules 200a, 200b are in operation, the processor 202 is configured to execute software stored within memory, to communicate data to and from the memory, and to generally control operations of the control modules 200a, 200b pursuant to the software instructions.

The control modules 200a, 200b may also include a network interface 204, a data store 206, memory 208, and the like, all of which are communicatively coupled therebetween and with the processor 202. The network interface 204 may be used to enable the control modules 200a, 200b to communicate on a network, such as to communicate control plane information to other control modules or to a network management system. The network interface 204 may include, for example, an Ethernet card (e.g., 10BaseT, Fast Ethernet, Gigabit Ethernet) or a wireless local area network (WLAN) card (e.g., 802.11a/b/g). The network interface 204 may include address, control, and/or data connections to enable appropriate communications on the network. The data store 206 may be used to store data, such as control plane information received from network elements 100 or other control modules, provisioning data, OAM&P data, etc. The data store 206 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 206 may incorporate electronic, magnetic, optical, and/or other types of storage media. The memory 208 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 208 may incorporate electronic, magnetic, optical, and/or other types of storage media. Note that the memory 208 may have a distributed architecture, where various components are situated remotely from one another, but may be accessed by the processor 202. In an exemplary embodiment, the processor, the network interface 204, the data store 206, and the memory 208 may be utilized to implement the shortest path routing systems and methods to determine a bidirectional, shortest path in a network with non-fully meshed nodes, vertices, or network elements.

From a logical perspective, each of the control modules 200a, 200b may include a state machine 210, a link database (DB) 212, a topology DB 214, and a circuit DB 216. In an exemplary embodiment, the control modules 200a, 200b are responsible for control plane processing. Generally, a control plane includes software, processes, algorithms, etc. that control configurable features of a network, such as automating discovery of network elements, capacity on the links, port availability on the network elements, connectivity between ports; dissemination of topology and bandwidth information between the network elements; calculation and creation of paths for connections; network level protection and restoration; and the like. In an exemplary embodiment, the control plane may utilize Automatically Switched Optical Network (ASON) as defined in G.8080/Y.1304, Architecture for the automatically switched optical network (ASON) (02/2005), the contents of which are herein incorporated by reference, and the like. In another exemplary embodiment, the control plane may utilize Generalized Multi-Protocol Label Switching (GMPLS) Architecture as defined in Request for Comments: 3945 (10/2004), the contents of which are herein incorporated by reference, and the like. In yet another exemplary embodiment, the control plane may utilize Optical Signaling and Routing Protocol (OSRP) from Ciena Corporation of Linthicum, Md. which is an optical routing protocol similar to PNNI (Private Network-to-Network Interface) and MPLS (Multiprotocol Label Switching). Those of ordinary skill in the art will recognize the network and the control plane may utilize any type control plane for controlling the network elements and establishing connections therebetween. The control plane may be centralized, distributed, or a combination thereof. In an exemplary embodiment, the shortest path routing systems and methods described herein may be implemented in the control plane as a mechanism to provide bidirectional, shortest path determinations in a network with non-fully meshed vertices or nodes.

The control modules 200a, 200b may be configured in a redundant 1+1, 1:1, etc. configuration. The state machine 210 is configured to maintain a state of each path configured in a network. The DBs 212, 214, 216 may be stored in the memory 208 and/or the data store 206. The link DB 212 includes updated information related to each link in a network. The topology DB 214 includes updated information related to the network topology, and the circuit DB 216 includes a listing of terminating circuits and transiting circuits at an network element where the control modules 200a, 200b are located. The control modules 200a, 200b may utilize control plane mechanisms to maintain the DBs 212, 214, 216. For example, HELLO messages can be used to discover and verify neighboring ports, nodes, protection bundles, boundary links, and the like. Also, the DBs 212, 214, 216 may share topology state messages to exchange information to maintain identical data. Collectively, the state machine 210 and the DBs 212, 214, 216 may be utilized to advertise topology information, capacity availability, and provide connection management (provisioning and restoration). For example, each link in a network may have various attributes associated with it such as, for example, line protection, available capacity, total capacity, administrative weight, protection bundle identification, delay, designation of boundary link, and the like. Further, these attributes may be utilized when implementing the shortest path routing systems and methods described herein. The state machine 210 and the DBs 212, 214, 216 may be configured to provide automated end-to-end provisioning. For example, a route for a connection may be computed from originating node to terminating node and optimized using the shortest path routing systems and methods.

Further, the control modules 200a, 200b are configured to communicate to other control modules 200a, 200b in other nodes on the network. This communication may be either in-band or out-of-band. For SONET networks and similarly for SDH networks, the control modules 200a, 200b may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the present invention includes an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. In an exemplary embodiment, GCC0, GCC1, GCC2 or GCC1+2 may be used for in-band signaling or routing to carry control plane traffic. Based on the intermediate equipment's termination layer, different bytes may be used to carry control plane traffic. If the ODU layer has faults, it has been ensured not to disrupt the GCC1 and GCC2 overhead bytes and thus achieving the proper delivery control plane packets.

Figure 7:
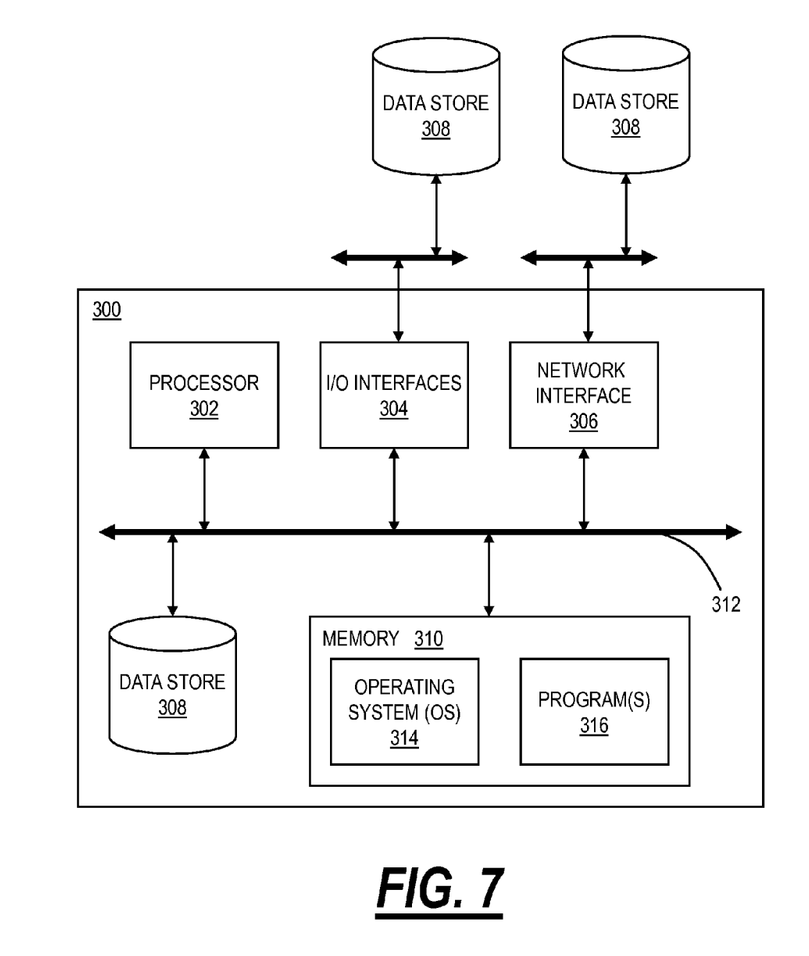
FIG. 7 is a block diagram of a server to provide shortest path routing systems and methods.

Referring to FIG. 7, in an exemplary embodiment, a block diagram illustrates a server 300 which may be used for the shortest path routing systems and methods described herein. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 7 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The operating system 314 may be any of Windows NT, Windows 2000, Windows XP, Windows Vista, Windows 7, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), Android and variants thereof (available from Google, Inc. of Mountain View, Calif.), OS X and variants thereof (available from Apple Corp. of Cupertino, Calif.), or the like. The one or more programs 316 may be configured to implement the various processes, algorithms, methods, techniques, etc. described herein.

In an exemplary embodiment, the server 300 may be utilized as a standalone system having network data stored in the data store 308 and a shortest path routing program in the data store and the memory 306 for execution by the processor 302. For example, as a standalone system, the server 300 may be a network planning system or the like. In another exemplary embodiment, the server 300 may be utilized as a network management system (NMS), element management system (EMS), craft interface (CI), operations support system (OSS), and the like that is communicatively coupled to one or more network elements in a network via, for example, the network interface 306. Here, the server 300 may also include network data stored in the data store 308 and continuously updated based on a current state of the network and a shortest path routing program in the data store and the memory 306 for execution by the processor 302. For example, a network operator may utilize the server 300 to provide a shortest path for a potential new bidirectional circuit, wavelength, connection, etc. in a network with non-fully meshed network elements, nodes, vertices, etc.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A shortest path routing method in a network with non-fully meshed vertices, comprising:
   using a controller coupled to a plurality of interconnected network elements, the controller configured to perform steps of;
   defining vertices for each degree in the network at each node in the network, the vertices at each degree comprising an ingress vertex and an egress vertex, wherein at least one node in the network comprises degrees which are not fully-meshed internally such that some of the degrees are not connected to one another directly internally at the at least one node and have no interconnectivity for signals between them; and
   implementing a Dijkstra algorithm in a constrained manner to determine a shortest, bidirectional path through the network between two degrees in the network;
   wherein each degree in the network, except for the degrees which are not fully-meshed, is configured to receive an ingress signal from an edge and transmit an egress signal to another degree at a same node for transmission to another edge; and
   wherein the each degree in the network is configured to receive an input signal from the edge and transmit an output signal to the edge, the edge comprising a bidirectional link.

2. The shortest path routing method of claim 1, wherein the constrained manner comprises maintaining each visited degree such that a same degree is not revisited in the Dijkstra algorithm.

3. The shortest path routing method of claim 1, further comprising:
   defining a transmit port to a receive port and a receive port to a transmit port as edges for each link in the network;
   wherein the constrained manner comprises maintaining a set of each visited degree based on the edges and implementing the Dijkstra algorithm to exclude each edge and associated vertices based on the set such that a same degree is not revisited in the Dijkstra algorithm.

4. The shortest path routing method of claim 1, wherein the ingress vertex comprises a demultiplexer and the egress vertex comprises a multiplexer.

5. The shortest path routing method of claim 4, wherein the network comprises an optical network, and the method further comprising:
   implementing the Dijkstra algorithm in the constrained manner to find a first path through the network between two degrees in the network; and
   utilizing opposite vertices at each degree in the first path to define a second path through the network between two vertices in the network, the first path comprising a path from a demultiplexer at a first degree of the two degrees to a multiplexer at a second degree of the two degrees, and the second path comprising a path from a multiplexer at the first degree to a demultiplexer at the second degree.

6. A network, comprising:
a plurality of interconnected network elements, each of the plurality of network elements comprising one or more degrees, wherein at least one network element comprises degrees which are not fully-meshed internally such that some of the degrees are not connected to one another directly internally at the at least one network element and have no interconnectivity for signals between them; and
a controller configured to determine a shortest path between any of the plurality of network elements, the controller configured to:
define an ingress vertex and an egress vertex for each degree of the one or more degrees; and
implement a Dijkstra algorithm in a constrained manner to determine a shortest path through the network between two degrees in the network;
wherein each degree in the network, except for the degrees which are not fully-meshed, is configured to receive an ingress signal from an edge and transmit an egress signal to another degree at a same node for transmission to another edge; and
wherein the each degree in the network is configured to receive an input signal from the edge and transmit an output signal to the edge, the edge comprising a bidirectional link.

7. The network of claim 6, wherein the constrained manner comprises the controller maintaining each visited degree such that a same degree is not revisited in the Dijkstra algorithm.

8. The network of claim 6, wherein the controller is further configured to:
define a transmit port to a receive port and a receive port to a transmit port as edges for each link in the network;
wherein the constrained manner comprises the controller maintaining a set of each visited degree based on the edges and implementing the Dijkstra algorithm to exclude each edge and associated vertices based on the set such that a same degree is not revisited in the Dijkstra algorithm.

9. The network of claim 6, wherein the ingress vertex comprises a demultiplexer and the egress vertex comprises a multiplexer.

10. The network of claim 9, wherein the network comprises an optical network, and the controller further configured to:
implement the Dijkstra algorithm in the constrained manner to find a first path through the network between two degrees in the network; and
utilize opposite vertices at each degree in the first path to define a second path through the network between two vertices in the network, the first path comprising a path from a demultiplexer at a first degree of the two degrees to a multiplexer at a second degree of the two degrees, and the second path comprising a path from a multiplexer at the first degree to a demultiplexer at the second degree.

11. A system, comprising:
a data store;
a network interface;
a processor, wherein the data store, the network interface, and the processor are communicatively coupled; and
wherein the processor is configured to:
maintain a network topology of a network, the network topology comprising vertices and edges;
define an ingress vertex and an egress vertex for each degree in the network at each node in the network, wherein at least one node in the network comprises degrees which are not fully-meshed internally such that some of the degrees are not connected to one another directly internally at the at least one node and are inaccessible to one another and have no interconnectivity for signals between them; and
implement a Dijkstra algorithm in a constrained manner to determine a shortest path through the network between an ingress vertex at a first degree in the network and an egress vertex at a second degree in the network;
wherein each degree in the network, except for the degrees which are not fully-meshed, is configured to receive an ingress signal from an edge and transmit an egress signal to another degree at a same node for transmission to another edge; and
wherein the each degree in the network is configured to receive an input signal from the edge and transmit an output signal to the edge, the edge comprising a bidirectional link.

12. The system of claim 11, wherein the network topology comprises a non-fully meshed topology in at least one node of the network.

13. The system of claim 12, wherein the system comprises a controller module in a network element.

14. The system of claim 12, wherein the system comprises a network planning system or a network management system.

15. The system of claim 12, wherein the constrained manner comprises maintaining each visited degree such that a same degree is not revisited in the Dijkstra algorithm.

* * * * *